(12) United States Patent
Ma et al.

(10) Patent No.: US 12,698,223 B2
(45) Date of Patent: Aug. 4, 2026

(54) RECYCLING SYSTEM

(71) Applicant: BYD COMPANY LIMITED, Shenzhen (CN)

(72) Inventors: Yuegeng Ma, Shenzhen (CN); Xiaodong Li, Shenzhen (CN); Junlan Lian, Shenzhen (CN); Hongye Lin, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 764 days.

(21) Appl. No.: 18/068,312

(22) Filed: Dec. 19, 2022

(65) Prior Publication Data

US 2023/0212043 A1    Jul. 6, 2023

(30) Foreign Application Priority Data

Dec. 31, 2021    (CN) .......................... 202123449546.X

(51) Int. Cl.
　　*C02F 1/48*　　　　(2023.01)
　　*B01F 23/231*　　　(2022.01)
　　(Continued)

(52) U.S. Cl.
　　CPC ........... *C02F 1/488* (2013.01); *B01J 19/0066* (2013.01); *B01J 19/18* (2013.01); *B03C 1/288* (2013.01);
　　(Continued)

(58) Field of Classification Search
　　CPC .. C02F 1/488; C02F 1/20; C02F 1/485; C02F 1/74; C02F 1/444; C02F 1/645;
　　(Continued)

(56) References Cited

U.S. PATENT DOCUMENTS 3,898,058 A * 8/1975 McGill .............. B01D 19/0005
　　　　　　　　　　　　　　　　　　　　　95/254
4,094,669 A * 6/1978 Balko ....................... C02F 9/00
　　　　　　　　　　　　　　　　　　　　　210/651
(Continued)

FOREIGN PATENT DOCUMENTS

CN　　　　1383912 A　　12/2002
CN　　　101913684 A　　12/2010
(Continued)

OTHER PUBLICATIONS

PCT/CN2022/139177 Written Opinion of the International Searching Authority (WOISA) (Year: 2023).*
(Continued)

*Primary Examiner* — Liam Royce
(74) *Attorney, Agent, or Firm* — Calfee, Halter & Griswold LLP

(57)　　　　　　ABSTRACT

A recycling system includes a reaction kettle, a stirring device, and an electromagnetic device. The reaction kettle is provided with a liquid inlet, a gas inlet, a liquid outlet, and a slag discharge port. The stirring device is arranged on the reaction kettle. The stirring device includes a stirring rod and at least one stirring paddle. One end of the stirring rod extends into the reaction kettle, and the at least one stirring paddle is arranged on the end of the stirring rod. The electromagnetic device includes a first electromagnetic coil, and the first electromagnetic coil is wound on an outer circumferential surface of the reaction kettle. The arrangement of the stirring device allows the geothermal water to fully contact with the gas, which is conducive for the suspension of the ferroferric oxide in the geothermal water.

15 Claims, 2 Drawing Sheets

(51) Int. Cl.

| | |
|---|---|
| *B01J 19/00* | (2006.01) |
| *B01J 19/18* | (2006.01) |
| *B03C 1/28* | (2006.01) |
| *C02F 1/20* | (2023.01) |
| *C02F 1/44* | (2023.01) |
| *C02F 1/64* | (2023.01) |
| *C02F 1/74* | (2023.01) |
| *C02F 101/20* | (2006.01) |
| *C02F 103/10* | (2006.01) |

(52) U.S. Cl.
CPC ............... *C02F 1/20* (2013.01); *C02F 1/485* (2013.01); *C02F 1/74* (2013.01); *B01F 23/2312* (2022.01); *B01J 19/1881* (2013.01); *B01J 2219/00779* (2013.01); *B01J 2219/0854* (2013.01); *C02F 1/444* (2013.01); *C02F 1/645* (2013.01); *C02F 2101/203* (2013.01); *C02F 2103/10* (2013.01); *C02F 2201/002* (2013.01); *C02F 2201/483* (2013.01)

(58) Field of Classification Search
CPC ............ C02F 2101/203; C02F 2103/10; C02F 2201/002; C02F 2201/483; B01J 19/0066; B01J 19/18; B01J 19/1881; B01J 19/12; B01J 2219/00779; B01J 2219/0854; B01J 2219/085; B01J 2219/12; B03C 1/288; B01F 23/2312
See application file for complete search history.

(56) References Cited

U.S. PATENT DOCUMENTS

| | | | | |
|---|---|---|---|---|
| 4,306,970 | A | * | 12/1981 | Tanaka .................... B03C 1/253 |
| | | | | 210/222 |
| 4,855,045 | A | * | 8/1989 | Reed ....................... B03C 1/288 |
| | | | | 435/178 |
| 5,509,999 | A | * | 4/1996 | Lindberg ................. C02F 1/66 |
| | | | | 162/37 |
| 2002/0185419 | A1 | * | 12/2002 | Chandler ................. C02F 1/50 |
| | | | | 210/337 |
| 2004/0101460 | A1 | * | 5/2004 | Arno ....................... C30B 25/14 |
| | | | | 422/177 |
| 2010/0148411 | A1 | | 6/2010 | Araseki et al. |

FOREIGN PATENT DOCUMENTS

| | | | | | |
|---|---|---|---|---|---|
| CN | 202876806 | U | | 4/2013 | |
| CN | 205948870 | U | | 2/2017 | |
| CN | 108298651 | A | | 7/2018 | |
| CN | 207838980 | U | | 9/2018 | |
| CN | 208406974 | U | | 1/2019 | |
| CN | 209222133 | U | | 8/2019 | |
| CN | 110937702 | A | * | 3/2020 | ........... B01F 27/172 |
| CN | 211051493 | U | * | 7/2020 | |
| CN | 111943435 | A | * | 11/2020 | ............... C02F 9/00 |
| CN | 111944546 | A | | 11/2020 | |
| CN | 111992170 | A | | 11/2020 | |
| CN | 211936918 | U | | 11/2020 | |
| CN | 212215515 | U | | 12/2020 | |
| CN | 112755938 | A | | 5/2021 | |
| CN | 215277357 | U | * | 12/2021 | |
| CN | 216704381 | U | | 6/2022 | |
| EP | 4458461 | A1 | | 11/2024 | |
| JP | H10118518 | A | | 5/1998 | |

OTHER PUBLICATIONS

PCT/CN2022/139177 International Search Report (ISR) (Year: 2023).*

* cited by examiner

RECYCLING SYSTEM

CROSS-REFERENCE TO RELATED APPLICATIONS

The present application claims priority to Chinese Patent Application No. 202123449546.X, entitled "RECYCLING SYSTEM", and filed on Dec. 31, 2021, which is incorporated herein by reference in its entirety.

FIELD

The application relates to the field of production and recycling technologies, and specifically, to a recycling system.

BACKGROUND

With the intensification of global crises such as fossil energy crisis and global climate warming, more attention is being paid to the development of clean energy. Geothermal energy, as a kind of clean energy with abundant reserves and huge exploitation potential, has constantly been technologically developed in the past century, and the installed electricity generation capacity from geothermal energy has been increasing. However, in the related art, after geothermal water is pumped from a geothermal well, steam generally needs to be separated from the geothermal water by methods such as flash or vacuum evaporation, to drive a steam turbine to generate electricity. Concentrated geothermal water remaining after separation includes a variety of metal ions, especially alkali metal and alkaline earth metal, as well as lithium, iron, lead, silver and zinc in different concentrations. Due to the special composition of the concentrated geothermal water, there is currently still no suitable apparatus system and operating method for the recycling of iron and the treatment of other precipitated impurities.

SUMMARY

The present disclosure aims to resolve at least one of the technical problems in the related art. One objective of the present disclosure is to provide a recycling system with a simple structure and high recycling efficiency.

A recycling system according to embodiments of the present disclosure includes a reaction kettle, a stirring device, and an electromagnetic device. The reaction kettle is provided with a liquid inlet, a gas inlet, a liquid outlet, and a slag discharge port. The stirring device is arranged on the reaction kettle. The stirring device includes a stirring rod and at least one stirring paddle. One end of the stirring rod extends into the reaction kettle, and the at least one stirring paddle is arranged on the end of the stirring rod. The electromagnetic device includes a first electromagnetic coil, and the first electromagnetic coil is wound on an outer circumferential surface of the reaction kettle.

With the arrangement of the reaction kettle, iron ions in geothermal water can chemically react with components of a gas and medicament in the reaction kettle to form ferroferric oxide. The arrangement of the stirring device on the reaction kettle allows the geothermal water to fully contact with the gas, which is conducive for the suspension of the ferroferric oxide in the geothermal water. In addition, the electromagnetic device arranged can generate a magnetic attraction to attract the ferroferric oxide, thereby separating the ferroferric oxide from the geothermal water. When the electromagnetic device is powered off, the magnetic attraction disappears, and the ferroferric oxide can be conveniently discharged from the slag discharge port, thereby achieving the recycling of the ferroferric oxide. The recycling system has a simple structure and high recycling efficiency.

In some embodiments, the recycling system further includes a liquid distributor. The liquid distributor is connected to an inner wall of the reaction kettle. The liquid distributor is arranged above the electromagnetic coil, and a liquid distributor outlet is formed at a bottom part of an outer circumferential side of the liquid distributor.

In some embodiments, the liquid distributor is connected with the liquid outlet.

In some embodiments, the electromagnetic device further includes a second electromagnetic coil. An outlet pipe is arranged at the slag discharge port, and the second electromagnetic coil is wound outside the outlet pipe.

In some embodiments, the outlet pipe includes a first pipe section, a second pipe section, and a third pipe section. One end of the first pipe section is connected with the slag discharge port. The second pipe section is arranged coaxially with the first pipe section, and the second pipe section is arranged on a side of the first pipe section away from a center of the reaction kettle. The third pipe section is connected between another end of the first pipe section and the second pipe section. A central axis of the third pipe section is deviated from a central axis of the first pipe section, and the second electromagnetic coil is wound outside the third pipe section.

In some embodiments, the reaction kettle is provided with an exhaust port and a fluid return. The recycling system further includes a condenser and a gas-liquid separator, and one end of the condenser is connected with the exhaust port. The gas-liquid separator includes a gas-liquid separator inlet, a gas-liquid separator exhaust port, and a gas-liquid separator liquid outlet. The gas-liquid separator inlet is connected with another end of the condenser, the gas-liquid separator exhaust port is in communication with outside, and the gas-liquid separator liquid outlet is connected with the fluid return.

In some embodiments, a gas distributing disc is arranged in the reaction kettle, and a plurality of aeration heads are arranged on the gas distributing disc.

In some embodiments, a filter membrane is arranged at the liquid outlet.

In some embodiments, a pore size of the filter membrane is defined as d, and the d satisfies: $0.3\ \mu m \leq d \leq 1\ \mu m$.

In some embodiments, the recycling system further includes a cabinet, and the reaction kettle is arranged in the cabinet.

In some embodiments, the liquid inlet is formed at an upper part of the reaction kettle, the air inlet and the liquid outlet are formed at a lower part of the reaction kettle and are spaced apart from each other, and the slag discharge port is formed at a bottom part of the reaction kettle.

In some embodiments, the reaction kettle is a metal member or a plastic member.

In some embodiments, the stirring rod and the at least one stirring paddle are both stainless steel members.

Additional aspects and advantages of the present disclosure are partially provided in the following description, and partially become apparent in the following description or understood through the practice of the present disclosure.

BRIEF DESCRIPTION OF THE DRAWINGS

The above and/or additional aspects and advantages of the present disclosure will become evident and easy to understand through embodiments described with reference with drawings outlined below.

Figure 1:
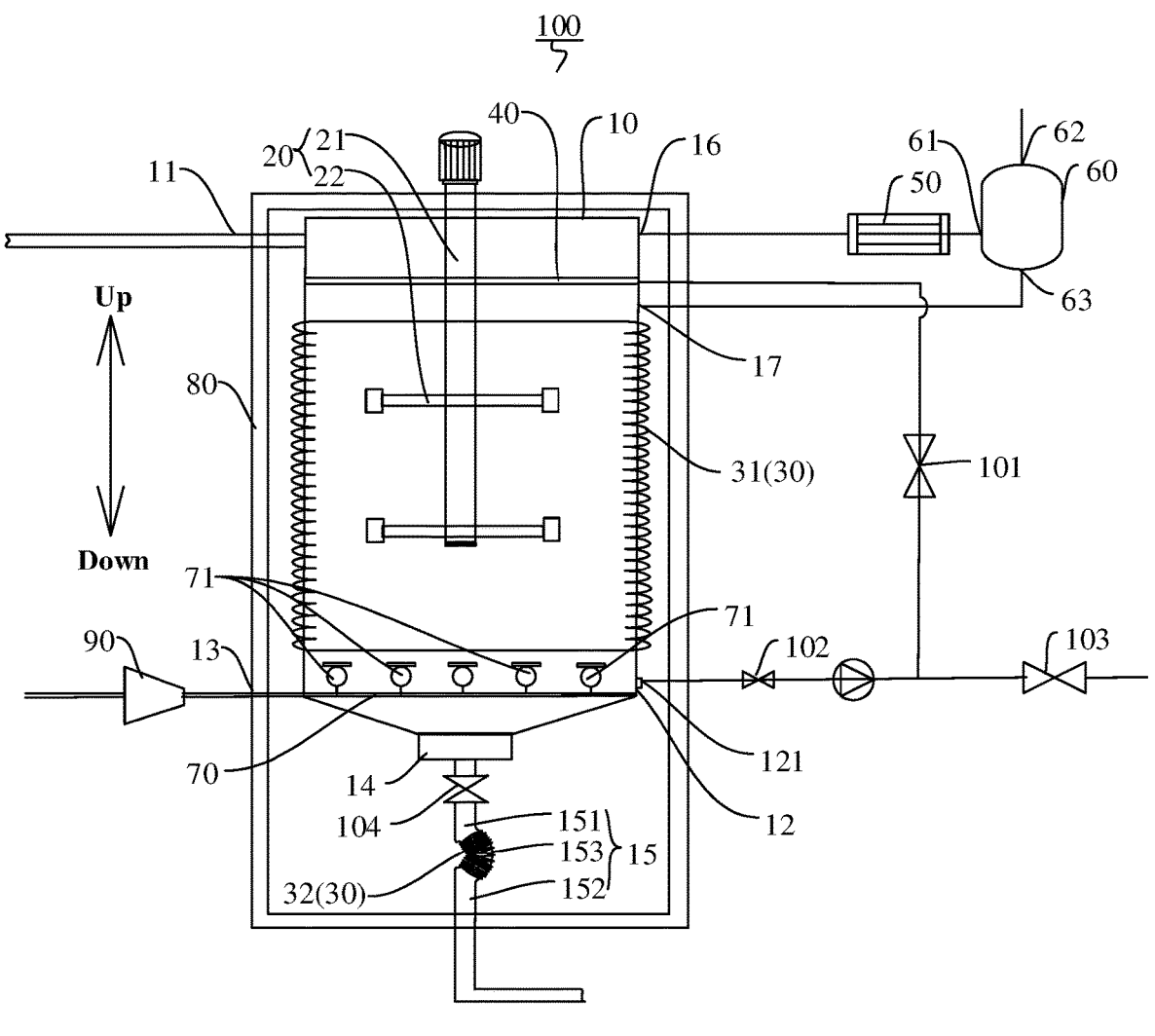
FIG. 1 is a schematic diagram of a recycling system according to an embodiment of the present disclosure.

REFERENCE NUMERALS OF THE
ACCOMPANYING DRAWING

Recycling system 100;

Reaction kettle 10; Liquid inlet 11; Liquid outlet 12; Filter membrane 121; Gas inlet 13; Slag discharge port 14; Outlet pipe 15; First pipe section 151; Second pipe section 152; Third pipe section 153; Exhaust port 16; Fluid return 17;

Stirring device 20; Stirring rod 21; Stirring paddle 22;

Electromagnetic device 30; First electromagnetic coil 31; Second electromagnetic coil 32;

Liquid distributor 40; Condenser 50;

Gas-liquid separator 60; Gas-liquid separator inlet 61; Gas-liquid separator exhaust port 62; Gas-liquid separator liquid outlet 63;

Gas distributing disc 70; Aeration head 71;

Cabinet 80; Air compressor 90; Reflux valve 101; Valve body 102; Liquid discharge valve 103; Slag discharge valve 104.

DETAILED DESCRIPTION

The embodiments of the present disclosure are described in detail below, and the embodiments described with reference to accompanying drawings are exemplary. A recycling system 100 according to an embodiment of the present disclosure is provided with reference to FIG. 1 to FIG. 3. The recycling system 100 includes a reaction kettle 10, a stirring device 20, and an electromagnetic device 30. The following describes the use of the recycling system for recovering iron ions in geothermal water pumped from a geothermal well, but the present disclosure is not limited thereto, and all magnetic ions after precipitation in the geothermal water can be recovered through the recycling system of the present disclosure.

Specifically, as shown in FIG. 1, the reaction kettle 10 is provided with a liquid inlet 11, a gas inlet 13, a liquid outlet 12, and a slag discharge port 14. The stirring device 20 is arranged on the reaction kettle 10. The stirring device 20 includes a stirring rod 21 and at least one stirring paddle 22. One end of the stirring rod 21 extends into the reaction kettle 10, and the at least one stirring paddle 22 is arranged on the end of the stirring rod 21. The electromagnetic device 30 includes a first electromagnetic coil 31, and the first electromagnetic coil 31 is wound on an outer circumferential surface of the reaction kettle 10.

The geothermal water may enter the reaction kettle 10 through the liquid inlet 11, and the geothermal water may be mixed with a medicament containing sodium hydroxide. Gas (for example, air) is introduced through the gas inlet 13 to enable the geothermal water to react in the reaction kettle 10, so that the iron ions in the geothermal water can generate ferroferric oxide. The stirring paddle 22 is used to stir the geothermal water in the reaction kettle 10, so that the gas can be fully mixed and contacted with the geothermal water, and the generated ferroferric oxide can be suspended in the geothermal water after stirring. After power is supplied to the first electromagnetic coil 31, the ferroferric oxide may be adsorbed on an inner wall of the reaction kettle 10 under a magnetic attraction generated by the first electromagnetic coil 31 and a centrifugal force generated by the stirring device 20. After the supply of power to first electromagnetic coil 31 is cut off, the magnetic attraction disappears, and the ferroferric oxide can be discharged through the slag discharge port 14 of the reaction kettle 10.

According to the recycling system 100 of the embodiment of the present disclosure, with the arrangement of the reaction kettle 10, the iron ions in the geothermal water can chemically react with components of the gas and the medicament in the reaction kettle 10 to generate ferroferric oxide. The arrangement of the stirring device 20 on the reaction kettle 10 allows the geothermal water to fully contact with the gas, which is conducive for the suspension of the ferroferric oxide in the geothermal water. In addition, the electromagnetic device 30 arranged can generate a magnetic attraction to attract the ferroferric oxide, thereby separating the ferroferric oxide from the geothermal water. When the electromagnetic device 30 is powered off, the magnetic attraction disappears, and the ferroferric oxide can be conveniently discharged from the slag discharge port 14. The recycling system has a simple structure and high recycling efficiency. The recycling system 100 may be used independently or as a part of another system, has relatively high practicability and flexibility, and avoids the introduction of an additional water source, thereby conserving fresh water and improving the recycling efficiency for geothermal water to be treated.

Figure 2:
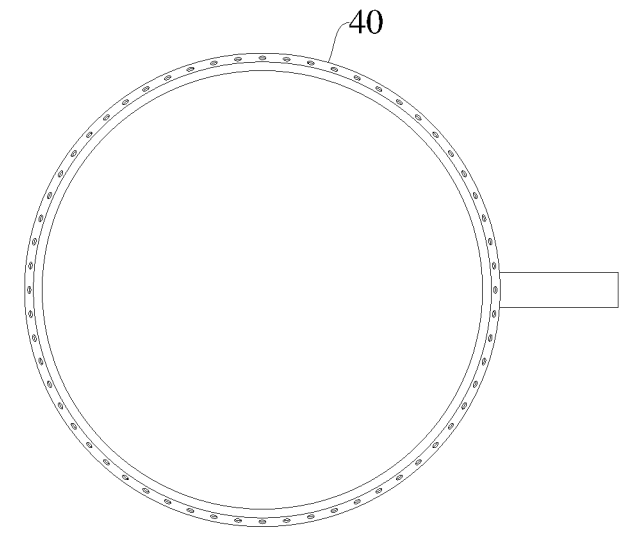
FIG. 2 is a schematic diagram of a liquid distributor of a recycling system according to an embodiment of the present disclosure.

In some embodiments, as shown in FIG. 1 and FIG. 2, the recycling system 100 further includes a liquid distributor 40. The liquid distributor 40 is connected to an inner wall of the reaction kettle 10. The liquid distributor 40 is arranged above the first electromagnetic coil 31, and a liquid distributor outlet is formed at a bottom part of an outer circumferential side of the liquid distributor 40. When the ferroferric oxide is adsorbed on the circumferential surface of the reaction kettle 10, a liquid in the liquid distributor 40 may flow out from the liquid distributor outlet and flush the ferroferric oxide adsorbed on the circumferential surface of the reaction kettle 10, to remove impurities mixed in the ferroferric oxide. The liquid distributor 40 may be arranged as one of a porous disc type, a trough type or a hybrid type.

In some embodiments, as shown in FIG. 1, the liquid distributor 40 is connected with the liquid outlet 12. A reflux valve 101 may be arranged at the liquid outlet 12. After the reflux valve 101 is switched on, part of the discharged geothermal water may be recycled through the liquid outlet 12, so that the part of the geothermal water may flow toward the liquid distributor 40 to flush the ferroferric oxide, thereby realizing recycling of the geothermal water and saving energy.

In some embodiments, as shown in FIG. 1, the electromagnetic device 30 further includes a second electromagnetic coil 32. An outlet pipe 15 is arranged at the slag discharge port 14, and the second electromagnetic coil 32 is wound outside the outlet pipe 15. The slag discharge port 14 is arranged below the reaction kettle 10. When the geothermal water in the reaction kettle 10 is discharged or the geothermal water is lower than a lowermost position of the first electromagnetic coil 31, the liquid outlet 12 is closed, the slag discharge port 14 is opened, and unadsorbed impurities are discharged through the slag discharge port 14 into the outlet pipe 15. At this time, the second electromagnetic coil 32 arranged outside the outlet pipe 15 operates, so that the ferroferric oxide can be adsorbed to a wall of the outlet pipe, and at the same time, the impurities are discharged through the outlet pipe 15, to achieve further filtering of the impurities.

Therefore, the arrangement of the second electromagnetic coil 32 can increase the number of times the ferroferric oxide in the impurities is extracted, so that the required ferroferric oxide can be recovered as much as possible, and the recycling efficiency of the recycling system 100 can be increased.

In some embodiments, as shown in FIG. 1, the outlet pipe 15 includes a first pipe section 151, a second pipe section 152, and a third pipe section 153. One end of the first pipe section 151 is connected with the slag discharge port 14. The second pipe section 152 is arranged coaxially with the first pipe section 151, and the second pipe section 152 is arranged on a side of the first pipe section 151 away from a center of the reaction kettle 10. The third pipe section 153 is connected between another end of the first pipe section 151 and the second pipe section 152. A central axis of the third pipe section 153 is deviated from a central axis of the first pipe section 151. The second electromagnetic coil 32 is wound outside the third pipe section 153.

The third pipe section 153 may be designed as a U-shaped pipe. One end of the U-shaped pipe is connected with the second pipe section 152, and another end of the U-shaped pipe is connected with the first pipe section 151. A slag discharge valve 104 may be arranged at a bottom part of the reaction kettle 10. One end of the slag discharge valve 104 away from the reaction kettle 10 is connected with the first pipe section 151, and the slag discharge valve 104 is configured to control opening and closing of the slag discharge port 14. The central axis of the third pipe section 153 is deviated from the central axis of the first pipe section 151 and a central axis of the second pipe section 152, to increase the time for the ferroferric oxide to flow in the outlet pipe 15, thereby facilitating adsorption of the ferroferric oxide by the second electromagnetic coil 32. The first pipe section 151 and the second pipe section 152 are arranged coaxially, the third pipe section 153 is connected between the first pipe section 151 and the second pipe section 152, the central axis of the third pipe section 153 is deviated from the central axis of the first pipe section 151, and the second electromagnetic coil 32 is arranged on the third pipe section 153, the second electromagnetic coil 32 can adsorb the ferroferric oxide, and the impurities can flow out directly from the outlet pipe 15, thereby realizing the separation of the impurities from the ferroferric oxide. In addition, such an arrangement can increase the time for the ferroferric oxide to flow through the outlet pipe 15, and prevent the ferroferric oxide from directly flowing out, thereby realizing sufficient filtering of the impurities and enhancing the effect of adsorbing the ferroferric oxide.

In some embodiments, as shown in FIG. 1, the reaction kettle 10 is provided with an exhaust port 16 and a fluid return 17. The recycling system 100 further includes a condenser 50 and a gas-liquid separator 60, and one end of the condenser 50 is connected with the exhaust port 16. The gas-liquid separator 60 includes a gas-liquid separator inlet 61, a gas-liquid separator exhaust port 62, and a gas-liquid separator liquid outlet 63. The gas-liquid separator inlet 61 is connected with another end of the condenser 50, the gas-liquid separator exhaust port 62 is in communication with outside, and the gas-liquid separator liquid outlet 63 is connected with the fluid return 17.

An upper end of the reaction kettle 10 is provided with an exhaust port 16 and a fluid return 17. When the reaction kettle 10 operates, gas rising inside the reaction kettle 10 may be discharged through the exhaust port 16 into the condenser 50, and formed into gas and liquid by the condenser 50 to flow into the gas-liquid separator 60. Due to relatively high temperature in the reaction kettle 10, a fluid entering the exhaust port 16 is a mixture of air and steam. The mixed fluid enters the condenser 50 to condense, so that the steam is condensed into saturated water, which flows back into the reaction kettle 10 along the fluid return 17, and the air is discharged along the exhaust port 62 of the gas-liquid separator 60. The exhaust port 62 of the gas-liquid separator 60 may be in communication with an external atmosphere to directly discharge the air into the atmosphere. Alternatively, the exhaust port 62 of the gas-liquid separator 60 may be connected to a gas treatment device (not shown), and the gas discharged from the gas-liquid separator 60 may be treated by the gas treatment device before being discharged. Therefore, the arrangement of the condenser 50 and the fluid return 17 can improve the utilization of the geothermal water, and discharge the gas.

Figure 3:
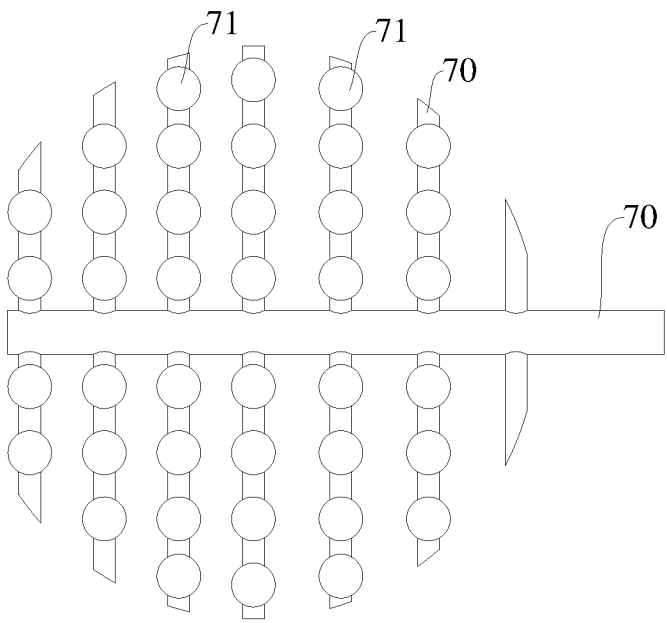
FIG. 3 is a schematic diagram of a gas distributing disc of a recycling system according to an embodiment of the present disclosure.

In some embodiments, as shown in FIG. 1 and FIG. 3, a gas distributing disc 70 is arranged in the reaction kettle 10, and multiple aeration heads 71 are arranged on the gas distributing disc 70. The gas distributing disc 70 may include a main pipe and multiple branch pipes. The multiple branch pipes are distributed on the main pipe at intervals, and the multiple branch pipes may be symmetrically arranged in the reaction kettle 10 with respect to a central axis of the reaction kettle 10. The multiple aeration heads 71 are arranged on the branch pipes at intervals. The aeration heads 71 are in communication with the branch pipes. The branch pipes are in communication with one end of the main pipe, and another end of the main pipe runs through the reaction kettle 10 at a lower part of the reaction kettle 10 and is in communication with outside. For example, the other end of the main pipe may be connected to an air compressor 90, and the air compressor 90 may introduce outside air into the gas distributing disc 70.

Therefore, the gas distributing disc 70 and the aeration heads 71 are arranged in the reaction kettle 10, and the aeration heads 71 may be arranged along a circumferential direction of the reaction kettle 10, so that the aeration heads 71 can be fully aerated with gases and the geothermal water can fully react to form ferroferric oxide, thereby improving the efficiency of recycling the ferroferric oxide.

In some embodiments, as shown in FIG. 1, a filter membrane 121 is arranged at the liquid outlet 12 to filter a solid in the geothermal water and prevent the solid from entering the valve body 102. The valve body 102 controls the opening and closing of the liquid outlet 12, to reduce the impact of the solid on the valve body 102, thereby improving the operational efficiency of the valve body 102 and prolonging the service life of the valve body 102.

In some embodiments, a pore size of the filter membrane 121 is defined as d, and d satisfies: $0.3 \ \mu m \leq d \leq 1 \ \mu m$. Therefore, by controlling the pore size of the filter membrane 121 to block the flowing of the solid in the geothermal water, it is ensured that some fine particles can be discharged without damaging the operation of the valve body 102, so that the ferroferric oxide can flow toward the slag discharge port 14, thereby improving the recycling of the ferroferric oxide, ensuring the service life of the valve body 102, and preventing the liquid outlet 12 from being blocked.

In some embodiments, as shown in FIG. 1, the recycling system 100 further includes a cabinet 80, and the reaction kettle 10 is arranged in the cabinet 80. Therefore, the arrangement of the reaction kettle 10 in the cabinet 80 can improve the usage safety of the reaction kettle 10, facilitate the installation of the reaction kettle 10, and improve the aesthetics of the entire recycling system 100. For example, the reaction kettle 10 is fixedly installed in the cabinet 80 to ensure the reliability of installation.

In some embodiments, the liquid inlet 11 is formed at an upper part of the reaction kettle 10. The air inlet 13 and the liquid outlet 12 are formed at a lower part of the reaction kettle 10 and are spaced apart from each other. For example, the air inlet 13 and the liquid outlet 12 are arranged opposite to each other in a radial direction of the reaction kettle 10, and are arranged close to the lower part of the reaction kettle 10. The slag discharge port 14 is formed at a bottom part of the reaction kettle 10. Therefore, the gas and the geothermal water can be fully mixed to improve the efficiency of chemical reaction. In addition, the arrangement of the liquid outlet 12 can facilitate the discharge of the geothermal water.

In some embodiments, the reaction kettle 10 is a metal member or a plastic member. Therefore, the material of the reaction kettle 10 may be selected according to an actual situation by considering both the recycling efficiency and the costs of manufacturing the reaction kettle 10.

In some embodiments, the stirring rod 21 and the at least one stirring paddle 22 are both stainless steel members. The main reason is that the stainless steel member has corrosion resistance, stable chemical stability, and high strength and hardness, and can reduce the impact of the at least one stirring paddle 22 and the stirring rod 21 on the geothermal water in the stirring process, so that the purity of the formed ferroferric oxide is higher, thereby facilitating the recycling of the recycling system 100.

The following describes an operation method of the recycling system 100 according to the present disclosure with reference to FIG. 1 to FIG. 3, which includes the steps as follows.

Step 1. A sodium hydroxide solution or the like is added to the heated geothermal water to adjust a condition required for the reaction. For example, sodium hydroxide can adjust the PH value of the geothermal water, which is conducive to the reaction in the recycling system 100. After the geothermal water is injected into the reaction kettle 10, air is introduced, followed by continuous stirring by the stirring device 20. Under the action of the aeration heads 71, the air is mixed with the geothermal water. Then air is introduced for another 30 minutes to 60 minutes, until all the ferroferric oxide precipitates.

Step 2. The air compressor 90 is kept on and the aeration heads 71 are kept operating. A motor of the recycling system 100 is turned on. The motor drives the stirring rod 21 to drive the at least one stirring paddle 22 to rotate and stir for 25 to 50 minutes, so that the ferroferric oxide completely suspends in the geothermal water.

Step 3. Power is supplied to the first electromagnetic coil 31 for 30 minutes to 60 minutes, so that a ferroferric oxide film is formed on the inner wall of the reaction kettle 10.

Step 4. The stirring device 20 and the air compressor 90 are powered off. The liquid outlet 12, the reflux valve 101 and the liquid discharge valve 103 are switched on, and the valve body 102 at the liquid outlet 12 is opened. Opening degrees of the reflux valve 101 and the liquid discharge valve 103 are adjusted, so that a liquid level in the reaction kettle 10 is lowered at a speed of 1 BV/h to 3 BV/h. A reflux solution flowing through the reflux valve 101 is distributed along the inner wall of the reaction kettle 10 through the liquid distributor 40, and the solution continuously flushes the ferroferric oxide on the wall of the reaction kettle 10 above the liquid level. When the liquid level is lower than the lowermost position of the first electromagnetic coil 31, the reflux valve 101 is switched off, and the remaining geothermal water is discharged.

Step 5. The slag discharge valve 104 is switched on to discharge the precipitated impurities, until a clear liquid without solid impurities flows out from the outlet pipe 15, and all the remaining clear liquid in the reaction kettle 10 is drained.

Step 6. The air compressor 90 is powered on again, and an interior of the reaction kettle 10 is blow-dried through the aeration heads 71 for 5 to 10 minutes.

Step 7. The first electromagnetic coil 31 and the second electromagnetic coil 32 are powered off, and the ferroferric oxide is recovered from the reaction kettle 10 and the outlet pipe 15.

In addition, during the reaction process in the reaction kettle 10, the exhaust port 16 and the fluid return 17 arranged on the reaction kettle 10 are respectively connected to the condenser 50 and the gas-liquid separator 60. The condenser 50 is configured to condense unreacted air and water vapor generated during the reaction. Condensed saturated water flows toward the reaction kettle 10 through the gas-liquid separator 60, and the air is discharged through the gas-liquid separator 60.

Therefore, iron in the geothermal water is directly recovered and separated from other impurities, so that the treatment efficiency of the geothermal water can be improved, and the investment costs of related devices in the recycling system 100 can be reduced. The recycling efficiency of the ferroferric oxide is high, and no additional water source is introduced, which conserves fresh water. The recycling system 100 has good versatility and sustainability.

In the description of the present disclosure, it should be understood that directions or location relationships indicated by terms "center", "longitudinal", "transversely", "length", "width", "thickness", "upper", "lower", "front", "rear", "left", "right", "vertical", "horizontal", "top", "bottom", "inner", "outer", "clockwise", "counterclockwise" "axial direction", "radial direction" and "circumferential direction" are directions or location relationships shown based on the accompanying drawings, are merely used for the convenience of describing the present disclosure and simplifying the description, but are not used to indicate or imply that a device or an element needs to have a particular direction or be constructed and operated in a particular direction, and therefore, cannot be understood as a limitation to the present disclosure.

In the description of the present disclosure, a "first feature", or a "second feature" can include one or more features. In the description of the present disclosure, "multiple" means two or more than two. In the description of the present disclosure, a first feature is "above" or "below" a second feature may include that the first feature directly contacts the second feature, or may include that the first feature does not contact the second feature directly but contacts the second feature through another feature between them. In description of the present disclosure, the first feature being "over", "above", and "on" the second feature includes that the first feature is directly above or obliquely above the second feature, or only means that a horizontal height of the first feature is higher than that of the second feature.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, exemplary descriptions of the foregoing terms do not necessarily refer to the same embodiment or example.

Although the embodiments of the present disclosure have been shown and described, a person skilled in the art can understand that the above embodiments cannot be construed to limit the present disclosure, and changes, alternatives, and modifications can be made in the embodiments without departing from the principle and the purpose of the present disclosure.

What is claimed is:

1. A recycling system, comprising:

a reaction kettle, wherein the reaction kettle is provided with a liquid inlet, a gas inlet, a liquid outlet, and a slag discharge port;

a stirring device, wherein the stirring device is arranged on the reaction kettle, the stirring device comprises a stirring rod and at least one stirring paddle, one end of the stirring rod extends into the reaction kettle, and the at least one stirring paddle is arranged on the end of the stirring rod; and an electromagnetic device, wherein the electromagnetic device comprises a first electromagnetic coil, and the first electromagnetic coil is wound on an outer circumferential surface of the reaction kettle, wherein the electromagnetic device further comprises a second electromagnetic coil;

an outlet pipe is arranged at the slag discharge port, and the second electromagnetic coil is wound outside the outlet pipe, wherein the outlet pipe comprises:

a first pipe section, wherein one end of the first pipe section is connected with the slag discharge port;

a second pipe section, wherein the second pipe section is arranged coaxially with the first pipe section, and the second pipe section is arranged on a side of the first pipe section away from a center of the reaction kettle; and a third pipe section, wherein the third pipe section is connected between another end of the first pipe section and the second pipe section, a central axis of the third pipe section is deviated from a central axis of the first pipe section, and the second electromagnetic coil is wound outside the third pipe section.

2. The recycling system according to claim 1, further comprising:

a liquid distributor, wherein the liquid distributor is connected to an inner wall of the reaction kettle, the liquid distributor is arranged above the electromagnetic coil, and a liquid distributor outlet is formed at a bottom part of an outer circumferential side of the liquid distributor.

3. The recycling system according to claim 2, wherein the liquid distributor is connected with the liquid outlet.

4. The recycling system according to claim 1, wherein the reaction kettle is provided with an exhaust port and a fluid return; and the recycling system further comprises:

a condenser, wherein one end of the condenser is connected with the exhaust port;

a gas-liquid separator, wherein the gas-liquid separator comprises a gas-liquid separator inlet, a gas-liquid separator exhaust port, and a gas-liquid separator liquid outlet, the gas-liquid separator inlet is connected with another end of the condenser, the gas-liquid separator exhaust port is in communication with outside, and the gas-liquid separator liquid outlet is connected with the fluid return.

5. The recycling system according to claim 1, wherein a gas distributing disc is arranged in the reaction kettle, and a plurality of aeration heads are arranged on the gas distributing disc.

6. The recycling system according to claim 1, wherein a filter membrane is arranged at the liquid outlet.

7. The recycling system according to claim 6, wherein a pore size of the filter membrane is defined as d, and the d satisfies: 0.3 $\mu m \leq d \leq 1$ $\mu m$.

8. The recycling system according to claim 1, further comprising:

a cabinet, wherein the reaction kettle is arranged in the cabinet.

9. The recycling system according to claim 1, wherein the liquid inlet is formed at an upper part of the reaction kettle, the gas inlet and the liquid outlet are formed at a lower part of the reaction kettle and are spaced apart from each other, and the slag discharge port is formed at a bottom part of the reaction kettle.

10. The recycling system according to claim 1, wherein the reaction kettle is a metal member or a plastic member.

11. The recycling system according to claim 1, wherein the stirring rod and the at least one stirring paddle are both stainless steel members.

12. The recycling system according to claim 7, further comprising:

a cabinet, wherein the reaction kettle is arranged in the cabinet.

13. The recycling system according to claim 12, wherein the liquid inlet is formed at an upper part of the reaction kettle, the gas inlet and the liquid outlet are formed at a lower part of the reaction kettle and are spaced apart from each other, and the slag discharge port is formed at a bottom part of the reaction kettle.

14. The recycling system according to claim 13, wherein the reaction kettle is a metal member or a plastic member.

15. The recycling system according to claim 14, wherein the stirring rod and the at least one stirring paddle are both stainless steel members.

* * * * *